US 8,777,800 B2

(12) United States Patent
Morel

(10) Patent No.: US 8,777,800 B2
(45) Date of Patent: Jul. 15, 2014

(54) MECHANICAL ASSEMBLY PROVIDED WITH MEANS FOR MONITORING FOR A STRUCTURAL ANOMALY, A GEARBOX PROVIDED WITH SUCH A MECHANICAL ASSEMBLY, AND A METHOD OF MONITORING FOR A STRUCTURAL ANOMALY

(75) Inventor: Herve Morel, Lamanon (FR)

(73) Assignee: Airbus Helicopters, Marignane Cedex (FR)

( * ) Notice: Subject to any disclaimer, the term of this patent is extended or adjusted under 35 U.S.C. 154(b) by 522 days.

(21) Appl. No.: 13/047,969

(22) Filed: Mar. 15, 2011

(65) Prior Publication Data

US 2011/0230304 A1    Sep. 22, 2011

(30) Foreign Application Priority Data

Mar. 19, 2010    (FR) ...................................... 10 01094

(51) Int. Cl.
*F16H 57/08*    (2006.01)
(52) U.S. Cl.
USPC ................................ 475/331; 73/593; 702/56
(58) Field of Classification Search
USPC ................................ 475/331; 73/593; 702/56
See application file for complete search history.

(56) References Cited

U.S. PATENT DOCUMENTS

| 4,237,454 A * | 12/1980 | Meyer .............................. 73/593 |
| 6,298,725 B1 * | 10/2001 | Forrester ......................... 73/593 |
| 6,484,582 B2 * | 11/2002 | Ehrfeld et al. ................... 73/593 |
| 2004/0200283 A1 | 10/2004 | Blunt |
| 2008/0279686 A1 * | 11/2008 | Demtroder .................... 475/158 |

FOREIGN PATENT DOCUMENTS

| DE | 4239096 A1 | 5/1994 |
| EP | 0899553 A2 | 3/1998 |
| EP | 0889314 A2 | 7/1999 |
| WO | 2007085259 A1 | 8/2007 |

OTHER PUBLICATIONS

Search Report and Written Opinion; Application No. FR 1001094; dated Nov. 3, 2010.

* cited by examiner

*Primary Examiner* — Derek D Knight
(74) *Attorney, Agent, or Firm* — Brooks Kushman P.C.

(57) ABSTRACT

The present invention relates to a mechanical assembly (10) provided with a sun gear (30) and a plurality of planet gears (50) co-operating with said sun gear (30). Each planet gear (50) includes a vibration sensor (61) forming part of structural anomaly monitoring means, said monitoring means being provided with a control member (63) that communicates with each vibration sensor (61) in order to receive a measurement signal coming from each vibration sensor (61) in order to enable anomaly monitoring to be performed.

13 Claims, 2 Drawing Sheets

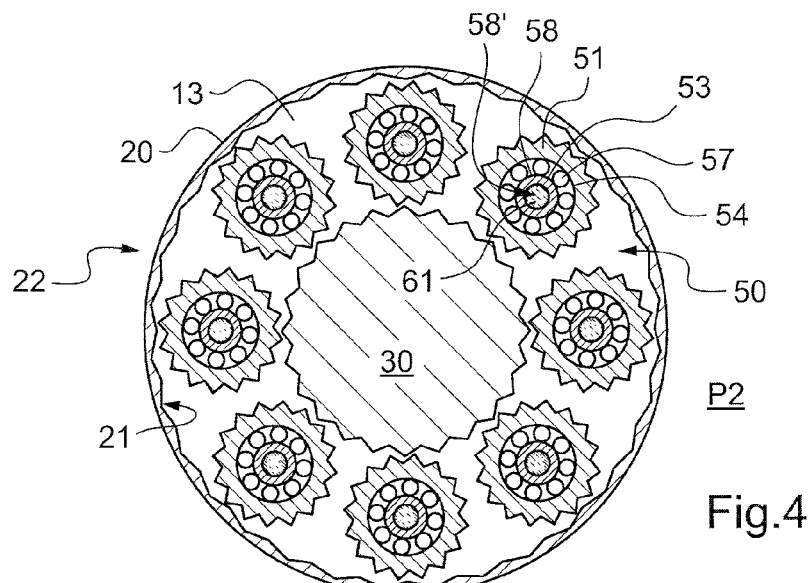
Fig.4
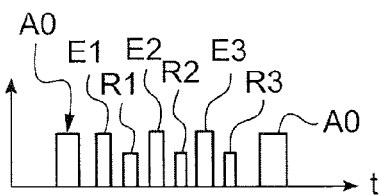
Fig.3
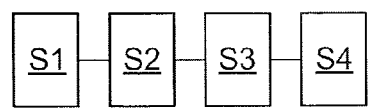
Fig.5
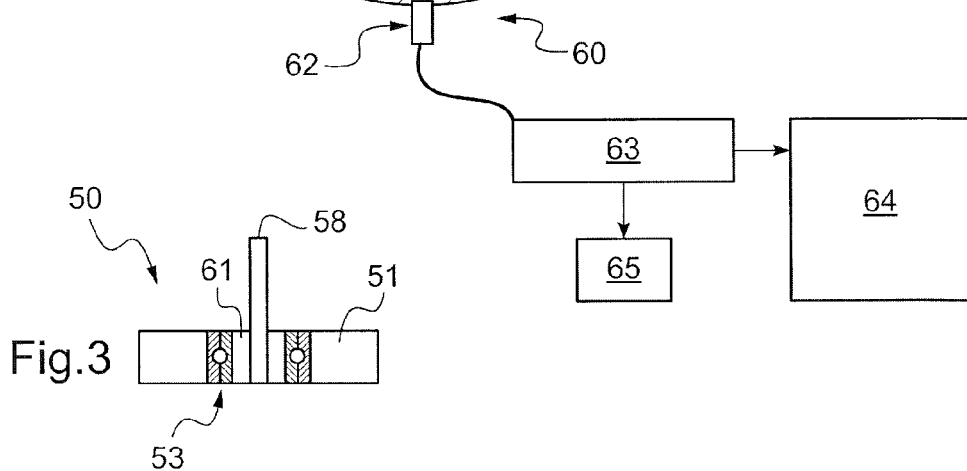
Fig.6
Fig.7

MECHANICAL ASSEMBLY PROVIDED WITH MEANS FOR MONITORING FOR A STRUCTURAL ANOMALY, A GEARBOX PROVIDED WITH SUCH A MECHANICAL ASSEMBLY, AND A METHOD OF MONITORING FOR A STRUCTURAL ANOMALY

CROSS REFERENCE TO RELATED APPLICATIONS

This application claims the benefit of FR 10 01094 filed on Mar. 19, 2010, the disclosure of which is incorporated in its entirety by reference herein.

BACKGROUND OF THE INVENTION (1). Field of the Invention

The present invention relates to a mechanical assembly provided with means for monitoring for a structural anomaly, to a gearbox provided with such a mechanical assembly, and to a method of monitoring for a structural anomaly, which method is implemented by said mechanical assembly.

More particularly, the invention relates to the field of gearboxes for aircraft, and in particular for rotorcraft of the helicopter type.

(2). Description of Related Art

A rotorcraft includes a power plant for setting its rotary wing into rotation. The power plant is provided with one or more engines for driving the gears of a gearbox, in particular a helicopter main gearbox that drives the rotary wing of the helicopter in rotation.

The main gearbox comprises a mechanical assembly having moving mechanical elements in contact with one another, e.g. elements of the gear type. Conventionally, the mechanical assembly includes a first shaft set into rotation by the power plant, the first shaft being secured to a sun gear of epicyclic speed-reduction means.

The sun gear then co-operates with a plurality of planet gears of said speed-reduction means. Each planet gear comprises a toothed body surrounding ball or roller rolling connection means fastened to a pin, the pin of the planet gear being secured to a planet carrier, the planet carrier being secured to a second shaft possibly constituting the mast of a rotorcraft rotor.

It should be observed that in the present specification, the term "rolling connection means" is used to designate a ball bearing or a roller bearing or any other known type of rolling bearing.

Under such circumstances, each planet gear moves in rotation both about its own first axis of rotation and also about a second axis of rotation of the planet carrier.

Furthermore, the mechanical assembly includes a toothed outer annulus with an inner periphery of the outer annulus co-operating with each of the planet gears. Each planet gear moves in an annular space situated between the inner periphery of the outer annulus and the sun gear.

It is found that the mechanical assembly is liable to deteriorate over time, for example cracks may appear in the body or the rolling connection means of a planet gear.

Visual inspections may be organized to detect any cracks, with damaged parts then being replaced. Similarly, it is also possible to search for the presence of metal particles in the liquid used for lubricating the mechanical assembly.

In order to facilitate crack detection, a technique is known that implements at least one accelerometer arranged on an outer periphery of the annulus that does not face the annular space. Each accelerometer is connected to a control member that receives and analyzes the signal coming from the accelerometer. It can be understood that the accelerometer is spaced apart from each of the components of a planet gear, and in particular from its rolling connection means by a distance that varies while said moving members are rotating.

The passage of a mechanical element over a crack gives rise to vibration that can be detected by an accelerometer. For example, the passage of a ball or a roller forming part of rolling connection means against a crack that exists in the body of a planet gear generates vibration. Thus, if the control member receives a crack-representing signal coming from an accelerometer, it is in a position to issue an alarm.

That device is very effective. Nevertheless, the vibration emitted by a ball or a roller passing over a crack is of very small amplitude. Because of the varying distance between the sensor of an accelerometer and the ball or roller at the time of said passage, there is a risk that the accelerometer will be too far away and that the control member will not detect said vibration.

Document EP 0 889 314 presents a method of monitoring a transmission assembly implemented by such a monitoring device, the method consisting in:

acquiring a signal from an accelerometer;

calculating a frequency domain transform of said signal in order to obtain a sequence of samples;

acquiring a sample in said sequence of samples, calculating a real amplitude value of said acquired sample;

calculating a relative difference between said real amplitude value and a reference amplitude value; and comparing said relative difference with at least a first predetermined threshold.

Similarly, document EP 0 899 553 describes a method of monitoring a transmission assembly implemented by such a monitoring device, and consisting in:

acquiring a signal from an acceleration sensor;

sampling said signal at a sampling frequency in order to obtain an initial sample sequence;

organizing the samples present in said initial sequence into groups, each group being defined by a predetermined number of samples, said sample groups being ordered in a succession and each of them having a respective position in said succession;

performing first filtering of said succession of sample groups in order to obtain an intermediate sample sequence; and processing said first intermediate sample sequence in order to obtain a final sample sequence.

The technological background includes in particular the following patent documents: WO 2007/085259, US 2004/200283, and DE 4 239 096.

For example, document DE 4 239 096 describes a device for monitoring twisting forces. That device is provided with a strain gauge transmitting signals to a receiver member via a wireless connection.

SUMMARY OF THE INVENTION

An object of the present invention is thus to propose a mechanical assembly provided with means for monitoring anomalies of all types and serving to improve the performance of the monitoring that is carried out.

According to the invention, a mechanical assembly is provided with a sun gear together with a plurality of planet gears co-operating with the sun gear, the mechanical assembly having a planet carrier carrying each planet gear, each planet gear comprising a toothed body and rolling connection means interposed between a bottom portion of a pin of the planet gear and the body, each pin having a projecting top portion secured to the planet carrier, each body of a planet gear being movable in rotation firstly about its own first axis of rotation and secondly about a second axis of rotation of the planet carrier, the mechanical assembly including an outer annulus having an inner periphery that co-operates with each planet gear, each planet gear being movable in an annular space situated between the inner periphery and the sun gear. The mechanical assembly then comprises epicyclic speed-reduction means, it being possible in particular for the sun gear to be connected to an engine by a first shaft and for the planet carrier to be constrained to rotate with a second shaft such as a mast of a rotorcraft rotor.

This mechanical assembly is remarkable in particular in that each planet gear includes a vibration sensor forming part of monitoring means for monitoring for a structural anomaly, the monitoring means being provided with a control member communicating with each vibration sensor in order to receive a measurement signal coming from each vibration sensor in order to enable anomaly monitoring to be performed.

Consequently, in the invention, vibration sensors are arranged not on the outer periphery of the outer annulus defining the annular space in which the planet gears moves, but within each planet gear.

Under such circumstances, a vibration sensor is always at a very short distance from any crack, thereby enabling anomaly detection to be optimized. By going against the usual solutions and considering that it is possible to arrange a vibration sensor within a planet gear, the invention makes it possible to optimize monitoring of the mechanical assembly.

In order to detect the anomaly, it is possible to use the measurement signal from each of the vibration sensors in known methods, e.g. the methods described in documents EP 0 899 553 and EP 0 889 314, or indeed in application of a method that is explained below in which vibratory signatures that result from the measurement signals coming from the vibration sensors are compared in order to perform anomaly diagnosis.

Since the planet gears are identical, any variation between two valid measurement signals is indicative of a structural anomaly in at least one of them.

Furthermore, the mechanical assembly may have one or more of the following additional characteristics.

For example, the control member may be a microcontroller or a microprocessor. In addition, a vibration sensor may equally well be either an accelerometer or an acoustic emission sensor.

Furthermore, since each vibration sensor is arranged in a planet gear, at least one vibration sensor is electrically self-powered. For example, a vibration sensor may be electrically self-powered by internal means for transforming the energy generated by the relative movement it performs around the first axis of rotation in particular, or indeed by internal means for transforming heat into electrical energy. This facilitates integration within a planet gear.

According to another aspect, a vibration sensor is optionally arranged inside the pin of a planet gear. Under such circumstances, for a pin including a cavity, the vibration sensor is arranged in the cavity.

It should be observed that the pin may naturally include said cavity. However if it does not include such a cavity, the pin may be machined in order to drill out the required cavity.

Optionally, the cavity may be closed in leaktight manner. Thus, the vibration sensor is in a sealed medium and does not run any risk of being damaged by means for lubricating the mechanical assembly.

Furthermore, a vibration sensor is then arranged on the first axis of rotation of symmetry of the corresponding planet gear. As a result each vibration sensor is also spaced apart from the inner periphery of the annulus and from the sun gear by a distance that is equal to the radius of the planet gear. Said distance is thus minimized, thereby optimizing anomaly detection.

For example, the vibration sensor is arranged inside the bottom portion of the pin.

In another aspect, the rolling connection means of a given planet gear are contained in a rolling plane, and the vibration sensor of the given planet gear is arranged in a monitoring plane overlying the rolling plane.

Optionally, the vibration sensor of a planet gear is located around the pin of the planet gear and above the rolling connection means of said planet gear so as to avoid being damaged by means for lubricating the rolling connection means.

In another aspect, the vibration sensors are placed in a common monitoring plane. The measurements taken by the vibration sensors are thus made uniform, thereby enabling the operation of the monitoring means to be optimized.

Furthermore, vibration sensor of a given planet gear may take measurements in a measurement plane parallel to the rolling plane of the given planet gear, e.g. the above-mentioned monitoring plane.

Thus, the vibration sensor may be a biaxial accelerometer suitable for taking measurements along two axes contained in the measurement plane, e.g. axes that are radial relative to the planet gear.

In a first variant, the control member is arranged close to the vibration sensors, e.g. on the outer periphery of the annulus.

In a second variant, the monitoring means include at least one antenna placed on an outer periphery of the annulus, the control member being remote and communicating with at least one vibration sensor via the antenna.

Thus, the control member communicates with the antenna, the antenna communicating with the vibration sensors.

Furthermore, the monitoring means may include a storage memory, with the measurement signals transiting via the control member and then being stored in the storage memory. The storage memory may be integrated in the control member.

Under such circumstances, in an embodiment, the control member is active and it determines whether the mechanical assembly includes an anomaly. The monitoring means may then include alarm means that are activated in the event of an anomaly being discovered, such as an audible or visible alarm.

In another embodiment, the measurement signals are stored so as to be used by an operator of a ground station after the mechanical assembly has been in use.

In addition to a mechanical assembly, the invention provides a rotorcraft gearbox including a mechanical assembly of the invention of the type described above.

Furthermore, the invention provides a method of monitoring for a structural anomaly in a mechanical assembly of the above-described type and having at least two vibration sensors, the method comprising the following steps:

acquiring one measurement signal per vibration sensor arranged in a planet gear;
  generating one vibratory signature per acquired measurement signal;
  comparing the vibratory signature coming from each vibration sensor with vibratory signatures coming from other vibration sensors; and
  observing that an anomaly is present in a given planet gear if the vibratory signature from the vibration sensor of said given planet gear differs from the vibratory signatures coming from other vibration sensors.

The vibratory signatures may be compared by metric analyses, such as comparing Euclidean distance or Mahalanobis distance, for example.

This method analyzes the vibratory signatures relative to one another. It is therefore easy to implement insofar as it does not require any training stage nor does it require any stage of calculating thresholds that are specific to each helicopter. It is therefore adaptable to any mechanical assembly.

The method may also include one or more of the following additional characteristics.

For example, the mechanical assembly has at least three vibration sensors, and the presence of an anomaly in a member connected to all of the planet gears is observed if the vibratory signatures coming from the vibration sensors differ from one another.

Furthermore, in an option, after acquiring a measurement signal, the integrity of the signal is verified in order to validate it, with each measurement signal of non-validated integrity being eliminated.

Consequently, a cyclic redundancy check (CRC) method may optionally be implemented.

Finally, the measurement signals may be acquired using vibration sensors either simultaneously or else sequentially, and said measurement signals may be transmitted to a control member in sequential manner prior to generating vibratory signatures.

BRIEF DESCRIPTION OF THE DRAWINGS

The invention and its advantages appear in greater detail from the following description of embodiments given by way of illustration with reference to the accompanying figures, in which:

FIG. 3 is a view relating to a second embodiment;

FIG. 4 is a view relating to a third embodiment;

FIG. 5 is a diagram explaining the method of the invention;

FIG. 6 shows a first variant of measurement signal acquisition; and

FIG. 7 shows a second variant of measurement signal acquisition.

Elements that are present in more than one of the figures are given the same references in each of them.

DETAILED DESCRIPTION OF THE PREFERRED EMBODIMENT

Figure 1:
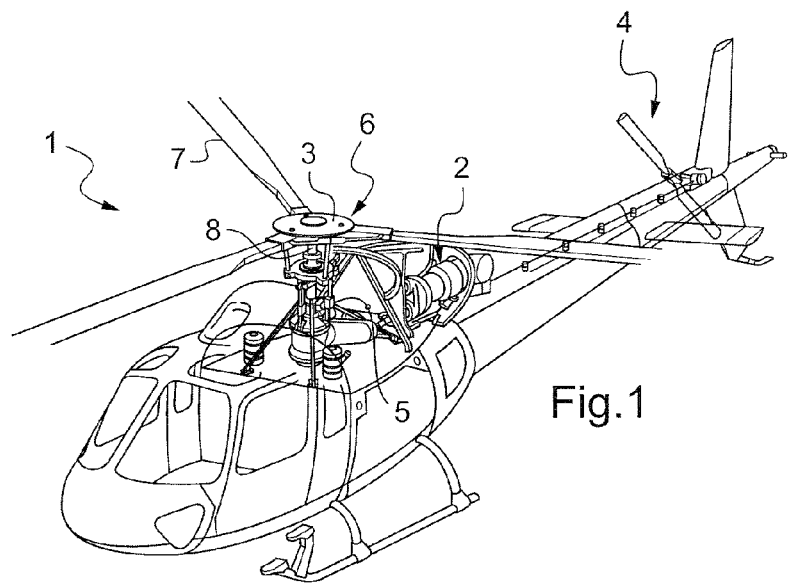
FIG. 1 is a view of a rotorcraft fitted with a main gearbox of the invention.

FIG. 1 shows a helicopter type rotorcraft 1 having a main gearbox 5 of the invention.

The rotorcraft comprises an engine serving in particular to drive both a main lift and propulsion rotor 3 and a tail rotor 4.

The main gearbox 5 then meshes with an inlet shaft set into motion by the engine 2 in order to drive a rotor mast 8, the rotor mast 8 being secured to a hub 6 of the main rotor 3 that carries a plurality of blades 7. The inlet shaft rotates at a first speed of rotation that is faster than the second speed of rotation to be reached by the main rotor 3, so the main gearbox includes at least one mechanical assembly of the invention constituting epicyclic speed-reduction means.

Figure 2:
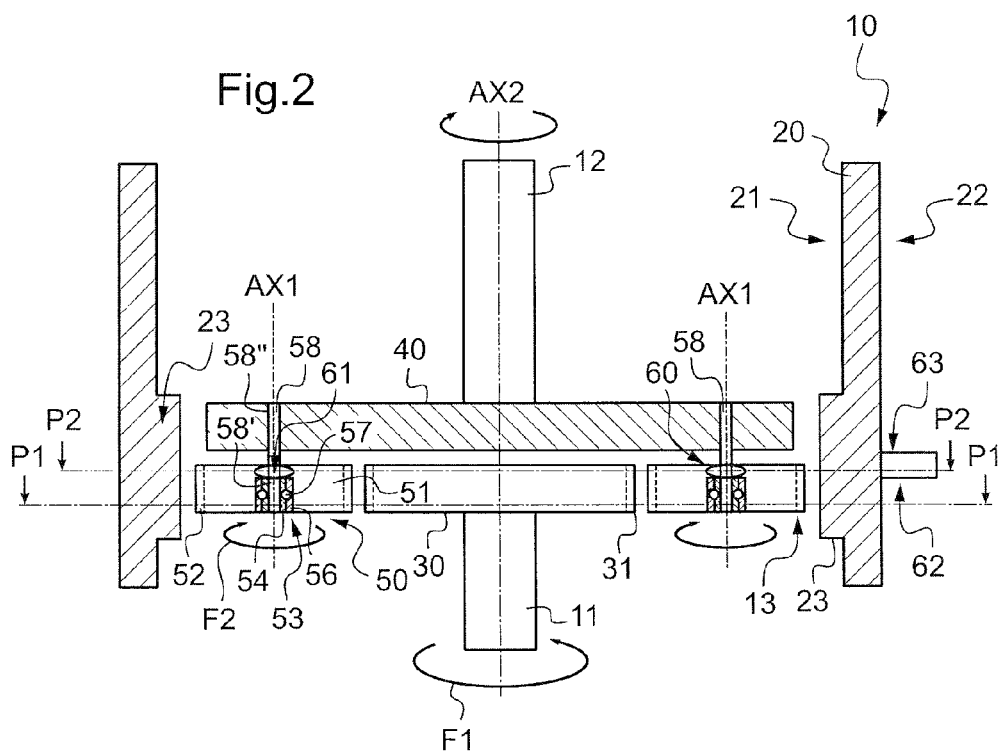
FIG. 2 is a section through a mechanical assembly in a first embodiment.

FIG. 2 is a section through such a mechanical assembly 10 in accordance with the invention.

Independently of the embodiment, the mechanical assembly 10 comprises epicyclic speed-reduction means having a sun gear 30 constrained to rotate with a first shaft 11, the first shaft 11 being set into motion directly or indirectly by an engine. The first shaft 11 and the sun gear 30 are arranged to rotate about a first axial axis of symmetry of the sun gear 30 and of the first shaft 11.

Furthermore, the sun gear 30 co-operates with a plurality of planet gears 50, each planet gear 50 having first teeth 52 meshing with second teeth 31 of the sun gear 30. Each planet gear includes a pin 58, rolling bearing connection means 53 of the ball bearing or roller bearing type, and a body 51 carrying said first teeth 52.

Thus, a bottom portion 58' of a pin 58 is inserted in the rolling connection means 53, the rolling connection means 53 being inserted in a cavity in the body 51 of a planet gear 50. More precisely, the rolling connection means 53 comprise a plurality of balls or rollers 57 sliding between an outer ring 54 and an inner ring 56, the pin 58 is fastened to the inner ring 56, while the outer ring 54 is fastened to the body 51. The rolling connection means 53 enable the body 51 of the corresponding planet gear 50 to rotate about a first axis of rotation AX1 along which the pin 58 extends, and in particular they allow the gear to revolve. The first axis of rotation AX1 is an axis of axial symmetry of the body 51, for example.

In addition, the mechanical assembly has an outer annulus 20 with its inner periphery 21 co-operating with the sun gear 30 to define an annular space 13. Each planet gear 50 thus moves in the annular space 13, co-operating firstly with the planet gear 30 and secondly with the annulus 20, and in particular with teeth 23 on the inner periphery 21 of the annulus 20.

Furthermore, each planet gear 50 is carried by a planet carrier 40 constrained to rotate with a second shaft 12 about its second axis of axial symmetry referred to as the second axis of rotation AX2, the second shaft 12 possibly being the rotor mast 8 of a rotorcraft.

Under such circumstances, the top portion 58" of the pin 58 of each planet gear 50 projects from the body 51 so as to be fastened to the planet carrier 40.

Consequently, rotation of the first shaft 11 as shown by arrow F1 drives rotation of the sun gear 30 about the second axis of rotation AX2. Since the outer annulus 20 is stationary, each body 51 both revolves about its own first axis of rotation AX1 as shown by arrow F2, and also moves in rotation about the gear 30 and thus about the second axis of rotation AX2. The relative rotary movement about the second axis of rotation AX2 drives rotation of the planet carrier via the pins 58 and causes the second shaft to rotate at a second speed of rotation that is slower than the first speed of rotation of the first shaft 11.

Operating the mechanical assembly can lead to degradation of the physical integrity of its various components. Cracks may appear in the planet carrier or in a planet gear, for example.

In order to diagnose the mechanical assembly 10 and detect a crack, if any, the mechanical assembly includes monitoring means 60 provided with one vibration sensor 61 per planet gear 50. Thus, each planet gear 50 is provided with a vibration sensor 61 of the accelerometer or acoustic emission type, for example.

Furthermore, the vibration sensor of a given planet gear may perform measurements in a measurement plane parallel to a rolling plane of the given planet gear and thus perpendicular to the first axis of rotation AX1 of said planet gear. Thus, the vibration sensor may be a biaxial accelerometer suitable for taking measurements along two axes contained in the measurement plane, e.g. axes that are radial relative to the planet gear.

Furthermore, the monitoring means comprise a control member 63 communicating with the vibration sensors 61 in order to instruct the vibration sensors to acquire vibration measurement signals and transmit said signals thereto.

By way of example, the control member 63 may be arranged on an outer periphery 23 of the annulus 20 and may communicate directly with the vibration sensor 61 via a wireless connection of the radio or ultrasound type, for example, or with reference to FIG. 2 it may be located remotely and communicate indirectly with the vibration sensor 61 via an antenna 62 arranged on the outer periphery 22. The antenna 62 may communicate via a wireless connection of the radio or ultrasound type, for example, with the vibration sensors and via a wireless or wired connection with the control member 63.

As described below, it is possible to use the measurement signals to diagnose the state of the mechanical assembly 10.

Each vibration sensor 51 may be self-powered, with the energy required for its operation being generated by the rotation of the associated planet gear 50, for example.

The vibration sensors are then compact and may be arranged without difficulty in a planet gear 50.

Furthermore, each sensor is contained in a monitoring plane P2, the monitoring plane P2 possibly overlying the rolling plane P1 containing the rolling connection means 53 of the planet gear 50.

With reference to FIG. 2, all of the vibration sensors 61 may be contained in the same monitoring plane P2, possibly coinciding with their measurement plane.

In the first embodiment shown in FIG. 2, a vibration sensor 61 is arranged about the pin 58 and above the rolling connection means 53 having balls or rollers of the associated planet gear, the body 51 surrounding both the rolling connection means 53 and the vibration sensor 61.

With reference to FIG. 3, in a second embodiment, the vibration sensor 61 of a given planet gear is arranged between the pin 58 and the rolling connection means 53 of the associated planet gear.

It should be observed that one vibration sensor of a mechanical assembly 10 may be arranged in accordance with the first embodiment, while another vibration sensor is arranged in accordance with the second embodiment, it nevertheless being possible for the vibration sensors to be placed in a common monitoring plane P2. Similarly, these first and second embodiments may be individually or jointly combined with a third embodiment.

With reference to FIG. 4, in a third embodiment that is preferred, the vibration sensor 61 of a given planet gear is arranged inside the pin 58 of said given planet gear 50, and more particularly in the bottom portion 58' of the pin.

Furthermore, the monitoring means 60 may include a storage memory 64 that communicates with the control member 63, e.g. a processor. The control member and the storage memory 64 may constitute a single piece of equipment.

The measurements taken by the vibration sensors under the control of the control member 63 are then stored in the storage memory 64 for later use, where appropriate after the end of a flight of the rotorcraft.

Likewise, the monitoring means 60 may include audible or visible alarm means 65. On the basis of the measurements taken by the vibration sensors 61, the control member may diagnose the mechanical assembly 10 by applying a preprogrammed method, e.g. the method of the invention, and may activate the alarm means if it is discovered that a component is faulty.

With reference to FIG. 5, in the invention, during a step S1, a measurement signal is acquired from each vibration sensor 61 arranged in a planet gear 50.

The control member 63 requests the vibration sensor 61 to verify the presence of vibration. For example, a crack occurring in the body of a planet gear will give rise to vibration when a ball or a roller of the rolling connection means 53, the annulus 20, or the body 51 slides against the crack.

Since the vibration sensors are very close to sensitive locations and to the crack, because each is arranged in a planet gear, such vibration is detected even if it turns out to be of small amplitude.

Each vibration sensor then sends a measurement signal to the control member 63, each measurement signal containing information relating to the detection or non-detection of vibration.

Optionally, the sending and receiving of the measurement signal may be performed in application of the cyclic redundancy check method by adding a key to the measurement signal. Reference may be made to the literature in order to obtain information about this method of checking received data.

When the control member 63 has acquired the measurement signals, it may store them in a storage memory 64, with the remainder of the method being implemented subsequently. In another variant, the control member implements the remainder of the monitoring method itself.

In a second step S2 following the first step S1, a vibratory signature is generated for each acquired measurement signal by using a known method, such as a Fourier transform, a parametric identification, or statistical parameter, for example.

A vibratory signature is thus obtained for each planet gear.

Thereafter, in a third step S3, the vibratory signature from each vibration sensor 61 is compared with vibratory signatures coming from the other vibration sensors 61. This comparison may be performed by a Euclidean distance comparison or indeed by a Mahalanobis distance comparison, for example.

Finally, in a step S4, a diagnosis is established from the comparison results.

For example, an anomaly is observed in a given planet gear if the vibratory signature coming from the vibration sensor 61 of the given planet gear 50 differs from the vibratory signatures coming from the other vibration sensors 61.

Since the planet gears are identical, their vibratory signatures will normally be identical. Under such circumstances, if a vibratory signature coming from a vibration sensor differs from at least one vibratory signature coming from another vibration sensor or indeed from all of the other vibration sensors, it is possible to deduce that an anomaly is present.

Furthermore, if the vibration sensors are arranged in the same plane, it is possible to locate faults by individually detecting the faults in the frequency domains inherent to the gears, i.e. where meshing takes place between a planet gear and a sun gear, or between a planet gear and the annulus, inherent to the first shaft, or inherent to the rolling connection means of the planet gear (outer ring fault frequency, inner ring fault frequency, rolling element fault frequency, i.e. ball or roller fault frequency, cage fault frequency).

Similarly, faults may be located by individually detecting faults in the frequency domain that are inherent to statistical indicators or to effective values.

Furthermore, when the mechanical assembly 10 has at least three vibration sensors 61, the presence of an anomaly in a member connected to all of the given planet gears 50 is observed if the vibratory signatures from the vibration sensors differ from one another. A generalized deviation reveals an anomaly in the annulus, the planet carrier, the second shaft, or the sun gear, for example.

With reference to FIGS. 6 and 7, the measurement signals are acquired from the vibration sensors 61 either simultaneously or sequentially and optionally in real time, and said measurement signals are sent to a control member 63 sequentially prior to generating the vibratory signatures. FIGS. 6 and 7 refer to three vibration sensors in order to illustrate the associated variants by way of example.

With reference to FIG. 6, the control member requests simultaneous acquisition A0. Thus, the control member requests all of the vibration sensors to perform a measurement simultaneously and to store that measurement.

Thereafter, the control member orders each vibration sensor in a predetermined sequence to send a measurement signal relating to the measurement it has taken.

For example, during a step E1, the control member requests a first vibration sensor to transmit its measurement, the first vibration sensor sending a first measurement signal in a step R1 that follows the step E1. In a step E2 that follows the step R1, the control member requests a second vibration sensor to transmit its measurement, the second vibration sensor sending the second measurement signal in a step R2 that follows the step E2. In a step E3 following the step R2, the control member requests a third vibration sensor to send its measurement, the third vibration sensor sending a third measurement signal in a step R3 that follows the step E3.

Thereafter, the control member begins a new cycle.

In another variant, the measuring and the sending of a measurement signal to the control member are performed sequentially in real time.

For example, a first coverage zone of the order to acquire a measurement may lie significantly upstream from a given point, i.e. from the control member and/or from the antenna of said control member, while a second coverage zone for transmitting the measurement signal may be located significantly downstream from said given point.

When the first vibration sensor enters the first coverage zone, the first vibration sensor receives the order to take a measurement during a first acquisition stage A0.

Thereafter, on reaching the second coverage zone following the first coverage zone, it sends a first measurement signal to the control member in a first transmission stage R1. In parallel, the second vibration sensor enters the first coverage zone, the second vibration sensor receiving an order to take a measurement during a second acquisition stage A1.

When the second vibration sensor reaches the second coverage zone following the first coverage zone, it transmits a second measurement signal to the control member during a third transmission stage R2. In parallel, the third vibration sensor enters the first coverage zone, the third vibration sensor receiving the order to take a measurement during a third acquisition stage A3.

Finally, when the third vibration sensor reaches the second coverage zone following the first coverage zone, it sends a third measurement signal to the control member during a third transmission stage R3. In parallel, the first vibration sensor once more enters the first coverage zone, and a new cycle then begins.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A mechanical assembly provided with a sun gear together with a plurality of planet gears cooperable with said sun gear, the mechanical assembly having a planet carrier carrying each planet gear, each planet gear comprising a toothed body and rolling connection means interposed between a bottom portion of a pin of the planet gear and said body, each pin having a projecting top portion secured to said planet carrier, each body being movable in rotation firstly about its own first axis of rotation and secondly about a second axis of rotation of the planet carrier, said mechanical assembly including an outer annulus having an inner periphery that co-operates with each planet gear, each planet gear being movable in an annular space situated between said inner periphery and said sun gear, each planet gear including a vibration sensor forming part of monitoring means for monitoring for a structural anomaly, said monitoring means being provided with a control member configured to communicate with each vibration sensor in order to receive a measurement signal from each vibration sensor in order to enable anomaly monitoring to be performed, wherein said monitoring means includes at least one antenna placed on an outer periphery of said annulus, said control member being configured to communicate with at least one of the vibration sensors via said at least one antenna;

wherein said monitoring means is configured to, after acquiring a measurement signal, verify integrity of the signal in order to validate it, and wherein said monitoring means is further configured to eliminate each measurement signal of non-validated integrity.

2. The mechanical assembly according to claim 1, wherein one of the vibration sensors is arranged inside the pin of one of the planet gears.

3. The mechanical assembly according to claim 2, wherein the one vibration sensor is arranged inside the bottom portion of said pin.

4. The mechanical assembly according to claim 1, wherein the rolling connection means of a given planet gear of the plurality of planet gears are contained in a rolling plane, and the vibration sensor of said given planet gear is arranged in a monitoring plane overlying said rolling plane.

5. The mechanical assembly according to claim 1, wherein said vibration sensor of a given planet gear of the plurality of planet gears takes measurements in a measurement plane parallel to a rolling plane of said given planet gear.

6. The mechanical assembly according to claim 1, wherein the vibration sensors are placed in a common monitoring plane.

7. The mechanical assembly according to claim 1, wherein said monitoring means include a storage memory.

8. The mechanical assembly according to claim 1, wherein said monitoring means include alarm means.

9. A rotorcraft gearbox, including the mechanical assembly according to claim 1.

10. A method of monitoring a mechanical assembly for an anomaly, wherein the mechanical assembly includes a sun gear, a plurality of planet gears that are cooperable with the sun gear, and a planet carrier carrying each planet gear, each planet gear comprising a toothed body and rolling connection means interposed between a bottom portion of a pin of the planet gear and the body, each pin having a projecting top portion secured to the planet carrier, each body being movable in rotation firstly about its own first axis of rotation and secondly about a second axis of rotation of the planet carrier, and wherein the mechanical assembly further includes an outer annulus having an inner periphery that co-operates with each planet gear, each planet gear being movable in an annular space situated between the inner periphery and the sun gear, each planet gear including a vibration sensor forming part of monitoring means for monitoring for a structural anomaly, the monitoring means being provided with a control member configured to communicate with each vibration sensor in order to receive a measurement signal from each vibration sensor in order to enable anomaly monitoring to be performed, wherein the monitoring means further includes at least one antenna placed on an outer periphery of the annulus, the control member being configured to communicate with at least one of the vibration sensors via the at least one antenna, the method comprising:

acquiring one measurement signal per vibration sensor arranged in each respective planet gear;

generating one vibratory signature per acquired measurement signal;

comparing the vibratory signature coming from each vibration sensor with the vibratory signatures coming from other vibration sensors; and observing that the anomaly is present in a given planet gear of the plurality of planet gears if the vibratory signature from the vibration sensor of said given planet gear differs from the vibratory signatures coming from other vibration sensors;

wherein after acquiring a measurement signal, integrity of the signal is verified in order to validate it, with each measurement signal of non-validated integrity being eliminated.

11. The method according to claim 10, wherein the mechanical assembly has at least three vibration sensors, and the presence of the anomaly in a member connected to all of the planet gears is observed if the vibratory signatures coming from the vibration sensors differ from one another.

12. The method according to claim 10, wherein the measurement signals are acquired using vibration sensors either simultaneously or else sequentially, and said measurement signals are transmitted to the control member in sequential manner prior to generating vibratory signatures.

13. A method of monitoring a mechanical assembly for an anomaly, wherein the assembly includes a sun gear, a plurality of planet gears that are cooperable with the sun gear and that are each provided with a vibration sensor, and a planet carrier carrying each planet gear, the method comprising:

acquiring a measurement signal per vibration sensor;

generating a vibratory signature per acquired measurement signal;

comparing the vibratory signature associated with each vibration sensor with the vibratory signatures associated with other vibration sensors; and observing that an anomaly is present in a given planet gear of the plurality of planet gears if the vibratory signature associated with the vibration sensor of the given planet gear differs from the vibratory signatures associated with other vibration sensors;

wherein after acquiring a measurement signal, integrity of the signal is verified in order to validate it, with each measurement signal of non-validated integrity being eliminated.

* * * * *